2,937,293
RESILIENT MOUNTING FOR PIEZO-ELECTRIC BODY

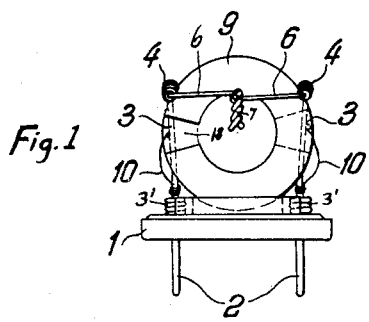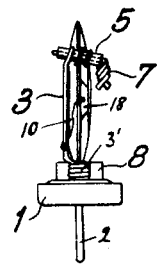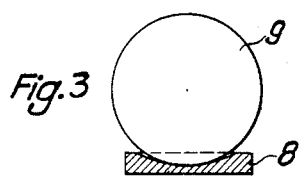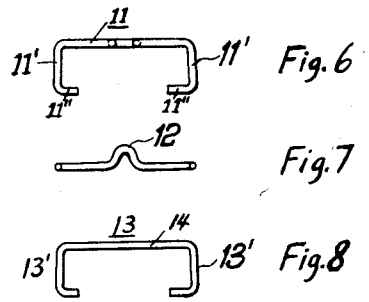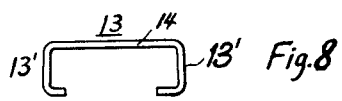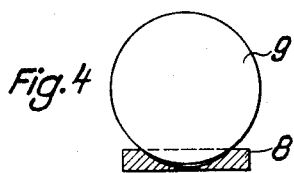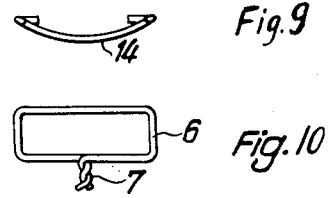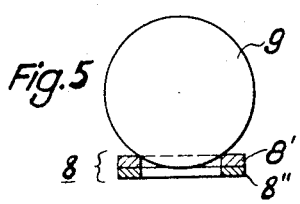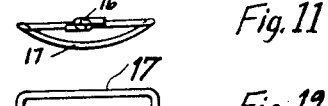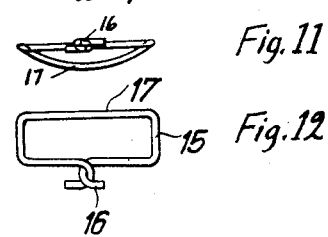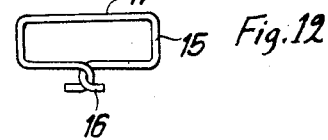

Hans Awender, Berlin-Nicolassee, and Erhard Becker, Berlin-Lichtenrade, Germany, assignors to Telefunken G.m.b.H., Berlin, Germany Application July 23, 1959, Serial No. 828,977

Claims priority, application Germany July 25, 1958

10 Claims. (Cl. 310—9.4)

The present invention relates to a mounting device for a substantially disk-shaped piezo-electric body having a bevel-edged rim, said piezo-electric body being held in the mounting device by means of resilient elements at at least two points of the rim of the body and being pressed by these elements at at least one further point of the rim on an additional supporting element.

The piezo-electric body is primarily supported in such a mounting device at at least three points of its rim, whereby at least one of the supporting elements must be resilient or elastic, while the two other supporting elements are stiff. Ordinarily, however, two of the supporting elements will be resilient and the third element stiff.

Mounting devices have been known in which the disk-shaped piezo-electric body is held at more than three points of its rim.

Such mounting devices are useful only if the piezo-electric body is firmly and securely fixed therein and can not be loosened in case of impacts exerted on the mounting device, and rotary movement of the piezo-electric body can not occur as a result of vibrations. Such rotary movement would not only impair the electric contacts between the electrodes of the piezo-electric body and the outer conductors, but would also result in a change of the piezo-electric oscillating properties of the body. These electrodes are applied in a known manner as metal coatings on the faces of the piezo-electric body or on a part thereof.

Such mounting devices must be designed in such a way that they can be produced economically in accordance with the methods of modern mass production. The mounting devices must be light and compact in order to meet the increasing demand for piezo-electric bodies to be used in apparatus of small weight requiring little space, as employed in communication circuits.

A mounting device for a substantially disk-shaped piezo-electric body has been known in which the piezo-electric body is clamped in a rectangular or approximately square frame comprising four posts. One pair of these posts arranged in the frame opposite to one another is made of metal, while the other pair is made of synthetic or plastic material. The metal posts serve simultaneously as electrical conductors, as they are applied with slight pressure to parts of the coatings protruding from the rim of the piezo-electric body. It has been found that this known construction of mounting device does not fulfill the necessary requirements. Under the action of vibrations, the piezo-electric body started to rotate in its mounting device so that, in addition to changes in the electric properties of the body, current interruptions at the contacts for the feed conductors occurred. While interruptions in the current supply did not always occur, slight rotations of the piezo-electric body in the mounting device caused changes of the contact resistance at the points of engagement.

Furthermore, a mounting device for a substantially disk-shaped piezo-electric body has been known in which two resilient elements made of wire press the disk-shaped body on a coating of synthetic material applied to the bottom of the mounting device. The free ends of the resilient elements were covered with synthetic or plastic material. The disk-shaped piezo-electric body in this mounting device supported at three points of the rim started to rotate when subjected to vibration, and even ejection of the piezo-electric body from the mounting means was observed. In addition, it is objectionable that in this mounting device an adjustment of the pressure of the resilient elements on the quartz disk is possible only with difficulty.

Therefore, it is an object of the present invention to provide a mounting device for a substantially disk-shaped piezo-electric body in which the aforementioned disadvantages of these known mounting devices are overcome.

It is another object of the invention to use wires as resilient elements in the novel mounting device and to provide the free ends of these wires with coils having several turns, holding tubular pieces of resilient material, the pitch of these turns being selected such that the rim of the piezo-electric body is supported by the tubular pieces surrounded by the coils.

It is a further object of the invention to provide the new mounting device with resilient elements, each comprising two different parts, i.e., a straight part which is generally parallel to one of the major surfaces of the disk-shaped piezo-electric body, and a helically-wound part attached to the straight part, the axis of the helically-wound part generally extending perpendicularly with respect to the major surfaces of the piezo-electric body. Due to the difference in design of the two parts, the spring constants thereof are also different. While the straight part is relatively stiff, the helically-wound part is considerably more resilient. Tubular pieces of rubber or synthetic or plastic material are inserted in the latter part, the bevel-edged rim of the piezo-electric body being supported by these tubular pieces. In its normal position, the rim of the piezo-electric body does not engage the turns of the resilient element. However, these turns, which are adjacent the rim, serve as protection against accidental ejection of the piezo-electric body from the mounting device in the event of shock to which the device may be subjected. In addition, the contact pressure of the resilient elements acting on the rim of the piezo-electric body can be more easily adjusted to the required amount, due to the fact that the resilient elements comprise two parts which are structurally different from one another, whereby rotational movement due to vibration is safely prevented.

In a preferred embodiment of this invention, the last-mentioned problem is solved by mechanically interconnecting the free ends of the resilient elements. The connecting element provided for this purpose is likewise resilient and serves to increase and adjust the friction acting on the rim of the piezo-electric body, as desired. This connecting element has, generally, the form of a yoke, the ends of which are inserted in the tubular pieces in the helically-wound ends of the resilient elements, or this connecting element has the shape of a wire hoop passed through the tubular pieces. The mechanical bias of the yoke or wire hoop is adjustable, permitting adjustment of the friction acting on the rim of the piezo-electric body to the desired value. For this purpose, several different constructions of the connecting elements may be used.

The above-mentioned mounting element which is provided in addition to the resilient elements and is ordinarily arranged on the bottom of the mounting device, is also suitably made of rubber-like, or synthetic or plastic material, and has a recess adapted to receive the rim of the piezo-electric body. The shape of this recess and its length and depth may be selected such that the piezo-electric body is primarily supported at one point of its rim on the bottom of the recess. In this case, a support at three points of the rim of the piezo-electric body is obtained, so that a three-point mounting is provided. The form of the recess and its length and depth may be such that the rim of the piezo-electric body is supported at the ends of the recess at two spaced points. In this case, a support at four points is obtained and the device will be called four-point-mounting.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 shows a side view of a preferred embodiment of a mounting device according to the present invention;

Figure 2 is a front view of the embodiment shown in Figure 1;

Figures 2–5 illustrate schematically different possibilities of seating the rim of the piezo-electric body on a base on the bottom of the mounting device, said base serving as further mounting means in addition to the resilient mounting elements;

Figures 6–12 show several embodiments of connecting elements to be inserted between the ends of the resilient elements, i.e., Figures 6, 8, 10, and 12 are top views and Figures 7, 9, and 11 illustrate the respective side views of the connecting elements shown in Figures 6, 8, and 12.

In Figures 1 and 2, bottom plate 1 of a mounting device carries two pins or prongs 2 which are passed through said plate. Resilient elements or wires 3 are attached to the upper ends of these prongs 2. For this purpose, the lower ends of these resilient elements 3 are helically wound to form loops or coils 3', the turns of which engage, i.e. seat on the upper ends of the prongs 2. The turns of the coils 3' are soldered to the ends of the prongs 2. In this way, the resilient elements 3 are fixed to the ends of the prongs 2 and are electrically connected thereto. The upper ends of the resilient elements 3 are also helically wound to provide coils 4 having turns, the pitch of which is selected such that the bevel-edged rim of the piezo-electric body 9 is clamped between these turns and is supported by elastic or resilient tubes 5 inserted in said coils 4 and normally engages the turns with slight friction.

These tubes 5 are short tubular pieces of synthetic or plastic material which are held in the two helically-wound coils 4 of the resilient elements 3, the rim of the disk-shaped piezo-electric body being engaged by these tubes 5. A wire hoop 6 is threaded through the two tubes 5 and the ends of this wire hoop are intertwined, forming a few turns at 7. By tightening these turns at 7 to a greater or less extent, it is possible to adjust the contact pressure between the coiled ends 4 of the resilient elements 3 or the tubes 5 and the piezo-electric body 9. Thus, by tightening the wire ends at 7 of the hoop 6 to a greater or less extent, the pressure at which the piezo-electric body 9 is applied to a base 8 mounted on the bottom plate 1 of the mounting device can be varied.

The electrodes for the piezo-electric body 9 are secured to this body as conductive metal coatings. The rim of the piezo-electric body is almost free of these metal coatings. However, a strip 18 of such coating extends on each side from the center to the bevel-edged rim of the piezo-electric body, a thin wire 10 being soldered to the coating at the rim on each side and connecting to the respective resilient element 3.

In the embodiment shown in Figures 1 and 2, the pressure at which the piezo-electric body 9 is applied to the base 8 by means of the resilient element 3 and the connecting hoop 6 can be finely adjusted. After final pressure adjustment, this pressure remains constant under any conditions and will not change when vibrations and/or shocks occur.

The pressure can be selected so that no rotation of the piezo-electric body 9 occurs during vibrations. An ejection of the piezo-electric body from its supporting means is avoided, because the resilient elements 3 are prevented from moving sideways by the connecting hoop 6. In addition to this, a lateral ejection of the bevel-edged rim from its seat is prevented by the turns of the coils 4 limiting the lateral movement of the rim. The base 8 has a recess in which the rim of the piezo-electric body 9 engages.

In Figures 3–5, several designs for the base 8 are illustrated, said base serving, in addition to the resilient elements 3, as holding means of the piezo-electric body 9. The base 8 is generally made of a rubber-like or a similar synthetic or plastic material.

According to Figure 3, the bottom of the recess in the base 8 is curved to a lesser extent than the periphery of the piezo-electric body 9. As a result of this, the piezo-electric body 9 engages the bottom in the recess of the base 8 at one point of its rim.

Figure 4 shows an embodiment of the base 8 in which this bottom of the recess has a larger curvature than the periphery of the piezo-electric body 9. As a result of this, the piezo-electric body 9 rests on the base 8 at two points of its rim, said points being located at the ends of the recess in the base 8.

In the embodiment according to Figure 5, the piezo-electric body 9 rests, also, at two points of its rim on the base 8, said base comprising two superimposed sheets 8' and 8" perforated by a slot-shaped opening.

In Figures 5 and 6 an embodiment of the connecting element is illustrated adapted to interconnect the ends of the resilient elements 3. This connecting element constitutes a wire yoke 11, the bent side arms 11' of which are adapted to be passed through the tubes 5 (Figures 1 and 2). The free ends 11" of these arms are bent to prevent the wire yoke from being detached from the tubes 5. The center part of this yoke-shaped connecting element 11 is provided with an elbow 12 which can be bent to a greater or less extent to adjust, as desired, the tension of the mounting means acting on the piezo-electric body. The elbow 12 in this embodiment serves the purpose of the intertwined wire ends at 7 shown in Figures 1 and 2.

Figures 8 and 9 likewise illustrate a yoke-shaped connecting element 13. However, the latter element does not have an elbow for the adjustment of the tension, rather it is slightly arched over the major part of its length or its center portion 14 so that the distance between the bent spring arms 13' can be adjusted by bending this arched portion 14 to adjust the biasing force acting on the piezo-electric body 9.

Figure 10 shows the connecting element used in Figure 1 in the shape of a wire hoop 6, the ends of which are intertwined, whereby the width of this wire hoop, and thereby the tension exerted thereby, are determined.

Figures 11 and 12 show a modified connecting element similar to that of Figure 10, but constituting a wire hoop 15, the ends of which are interengaged by hooks at 16. A major portion 17 of the hoop 15 is slightly arched so that by further bending of this portion 17 the distance between the wire ends, and thus the tension, can be adjusted.

The connecting elements illustrated in Figures 6–12 may result in an improved assembly of the mounting means in a housing. If a flat box-shaped hood (not shown in Figure 1) were placed over the assembly and secured to the bottom part 1 of the mounting device, the outer parts of the hoop or yoke or of the connecting elements would engage the inner wall of this hood. As a result of this, a superior firm support would be obtained protecting the encased piezo-electric body against damages in the event of heavy thrusts or jolts.

We claim:

1. A resilient mounting device for a piezo-electric disk-shaped bevel-edged body, comprising a base on which said body is supported at at least one point of its rim, at least two resilient wire means extending from said base and ending in helically-wound coils, members of elastic material held by and in said coils, said rim at at least two points spaced from one another engaging said members between the coil turns, the pitch of which is such as to permit said body to be received therebetween, whereby said body is clamped between said base and said members.

2. A resilient mounting device according to claim 1, wherein said members of elastic material comprise resilient tubular pieces having the elastic property of rubber.

3. A resilient mounting device according to claim 2, wherein said pieces of elastic material are resilient tubes of plastic synthetic material.

4. A resilient mounting device according to claim 2, wherein a bent resilient element is threaded through said tubular pieces to apply clamping pressure to said body.

5. A resilient mounting device according to claim 2, wherein a wire is looped through said tubular pieces and the ends of said wire are intertwined, whereby by tightening and loosening of said intertwined wire ends the clamping pressure applied to the said body can be adjusted.

6. A resilient mounting device according to claim 2, wherein a yoke is threaded with its ends through said tubular pieces, and wherein a major portion of said yoke forms a bow adapted to apply pressure to said body via said tubular pieces.

7. A resilient mounting device according to claim 1, wherein said base has a shallow recess of approximately the contour of said rim so as to receive a portion of the latter.

8. A resilient mounting device according to claim 1, wherein the curvature of the bottom wall of said recess is larger than that of said rim so that the latter engages said bottom wall at one point.

9. A resilient mounting device according to claim 1, wherein the curvature of the bottom wall of said recess is smaller than that of said rim so that the latter at two points spaced from one another is seated on the ends of said bottom wall.

10. A resilient mounting device according to claim 1, wherein said base is made of synthetic plastic material.

No references cited.